United States Patent [19]

Kish

[11] 4,408,381

[45] Oct. 11, 1983

[54] DEVICE FOR ASSEMBLING A HOSE AND FITTING

[75] Inventor: Arthur S. Kish, Lyndhurst, Ohio

[73] Assignee: Murray Corporation, Cockeysville, Md.

[21] Appl. No.: 284,967

[22] Filed: Jul. 20, 1981

Related U.S. Application Data

[63] Continuation-in-part of Ser. No. 186,330, Sep. 11, 1980, abandoned.

[51] Int. Cl.³ .......... B23P 19/04

[52] U.S. Cl. .......... 29/237; 29/267

[58] Field of Search .......... 29/237, 234, 287, 282; 254/29 R; 269/279, 157, 101

[56] References Cited

U.S. PATENT DOCUMENTS

| | | | |
|---|---|---|---|
| 1,321,208 | 11/1919 | Hinnershitz | 269/279 |
| 2,941,598 | 6/1960 | Jackson | 254/29 R |
| 3,483,607 | 12/1969 | Madden | 254/29 R |

*Primary Examiner*—James L. Jones, Jr.

*Attorney, Agent, or Firm*—Isler and Ornstein

[57] ABSTRACT

A device or tool is disclosed for assembling the hose and fitting of hose assemblies used in automotive air conditioning systems. The device comprises means for supporting the hose and fitting in spaced axial alignment with each other, and means including a handle and linkage responsive to movement of the handle for causing toothed rolls to engage diametrically opposite sides of the hose and force the hose over the end portion of the fitting. The toothed rolls are mounted eccentrically of studs on the handle and linkage, so as to vary the spacing between the rolls to accommodate therebetween hoses of different diameter.

8 Claims, 6 Drawing Figures

DEVICE FOR ASSEMBLING A HOSE AND FITTING

This application is a continuation-in-part of my co-pending application, Ser. No. 186,330, filed Sept. 11, 1980 and now abandoned.

BACKGROUND OF THE INVENTION

In Kish U.S. Pat. No. 4,114,656, a hose assembly for use in automotive air conditioning systems, is disclosed, the assembly consisting of a hose, a shell crimped to the end of the hose, and a fitting.

The hose is a standard type of hose, made for example, of seamless oil-resistant synthetic rubber. The shell is made from a thin-walled tube of deep drawing steel, aluminum and/or brass, which covers an end portion of the hose and is crimped to the hose. The fitting is a tube or nipple made of welded steel, aluminum and/or brass tubing and extends through a hole in the shell and into that end portion of the hose which is covered by the shell.

The portion of the fitting which extends into the hose is provided with a series of longitudinally or axially spaced circumferential or annular ridges, ribs or barbs which project from the outer surface of the fitting. For the purpose of limiting the extent of entry of the fitting into the hose, the fitting is upset or formed to provide an annular bead which provides a shoulder which engages with the end of the hose.

Due to the fact that the fitting is provided with the aforesaid annular ridges, ribs or barbs which are of slightly larger external diameter than the internal diameter of the hose, considerable force must be exercised in inserting the fitting into the hose, a laborious and time-consuming operation in assembling the hose and fitting.

SUMMARY OF THE INVENTION

The invention has as its primary object the provision of a device or tool of the character described, which is especially adapted for assembling the hose and fitting of such a hose assembly and which greatly facilitates the assembly operation as well as the speed of assembly.

Another object of the invention is to provide a device or tool of the character described, which insures that the fitting and hose are properly aligned with each other during their assembly.

Another object of the invention is to provide a device or tool of the character described, which is compact in construction and consists of a minimum number of parts which can be manufactured inexpensively and quickly and easily assembled.

A further object of the invention is to provide a device or tool of the character described which can be mounted for use in a standard vise, and which when not in use, can be stored in a small area or space.

A still further object of the invention is to provide a device of the character described, having a block for receiving the fitting, which block has separate self-gripping jaws for receiving the fitting.

A still further object of the invention is to provide a device or tool of the character described, which can be used for assembling hoses and fittings of different sizes or diameters.

The foregoing and other features and objects of the invention and the manner of attaining them will become more apparent and the invention itself will be best understood by reference to the following description of an embodiment of the invention taken in conjunction with the accompanying drawings.

BRIEF DESCRIPTION OF THE DRAWINGS

The present invention may be better understood and the numerous objects and advantages will become apparent to those skilled in the art by reference to the accompanying drawings wherein like reference numerals refer to like elements or parts in the various figures and in which.

DESCRIPTION OF A PREFERRED EMBODIMENT

Figure 1:
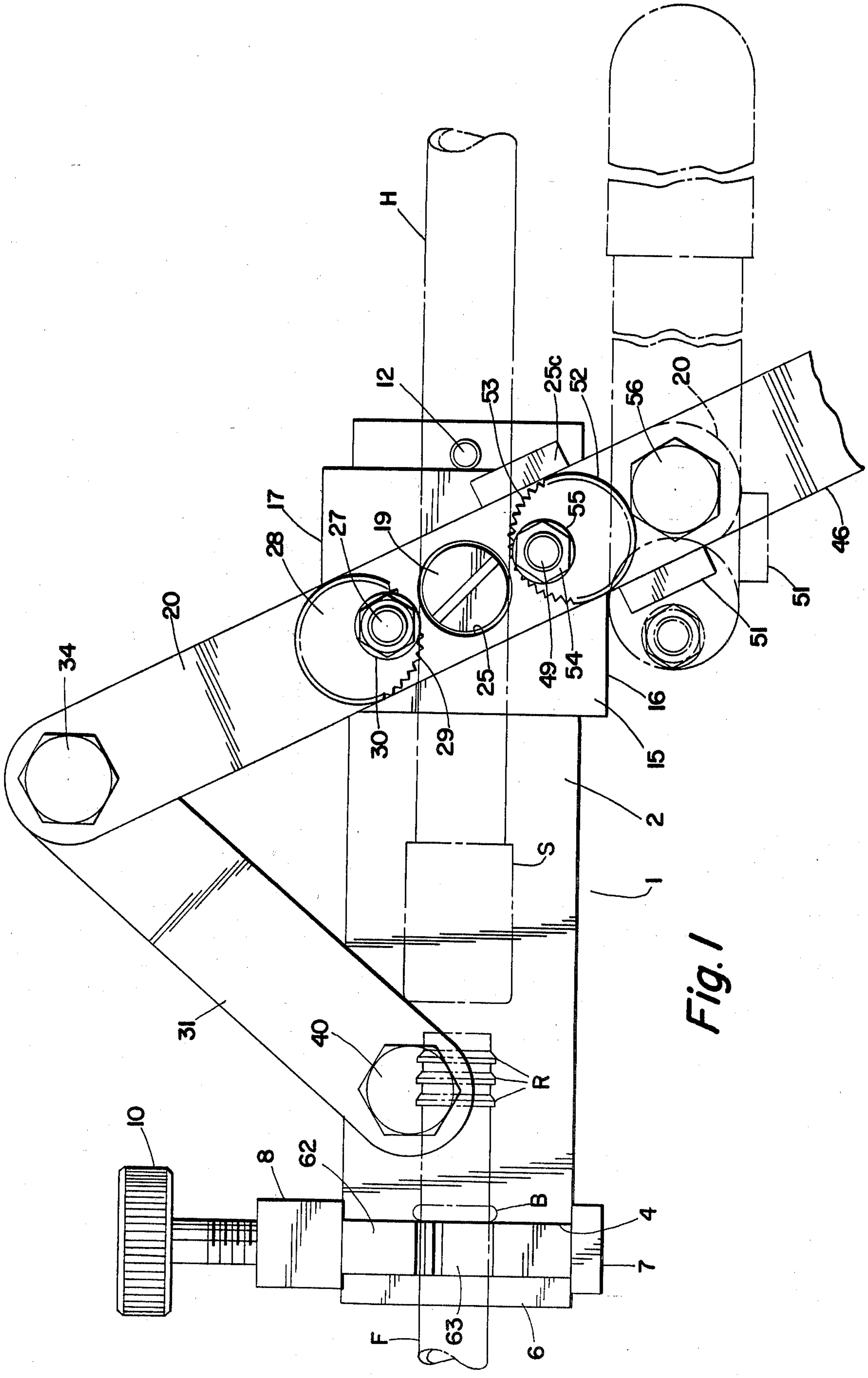
FIG. 1 is a fragmentary top plan view of the device or tool embodying the invention, with portions thereof at the beginning of the assembly operation shown in solid lines, and the handle just prior to the beginning of the operation shown in broken lines.

Referring more particularly to the drawings, the hose and fitting assembly device or tool will be seen to comprise a weld assembly or frame generally designated by reference numeral 1.

The weld assembly or frame 1 consists of an elongated base 2, which terminates at its forward end in a socket 3 of U-shaped configuration or cross-section, having a rear wall 4, a bottom 5, and a front wall 6.

The socket 3 is closed at one end by a rectangular tab 7, which is welded to one end of the socket 3, and is closed at its other end by a rectangular block 8, which is welded to the other end of the socket. The block 8 has a threaded opening 9, in which a thumb screw 10 is threadedly mounted.

Figure 3:
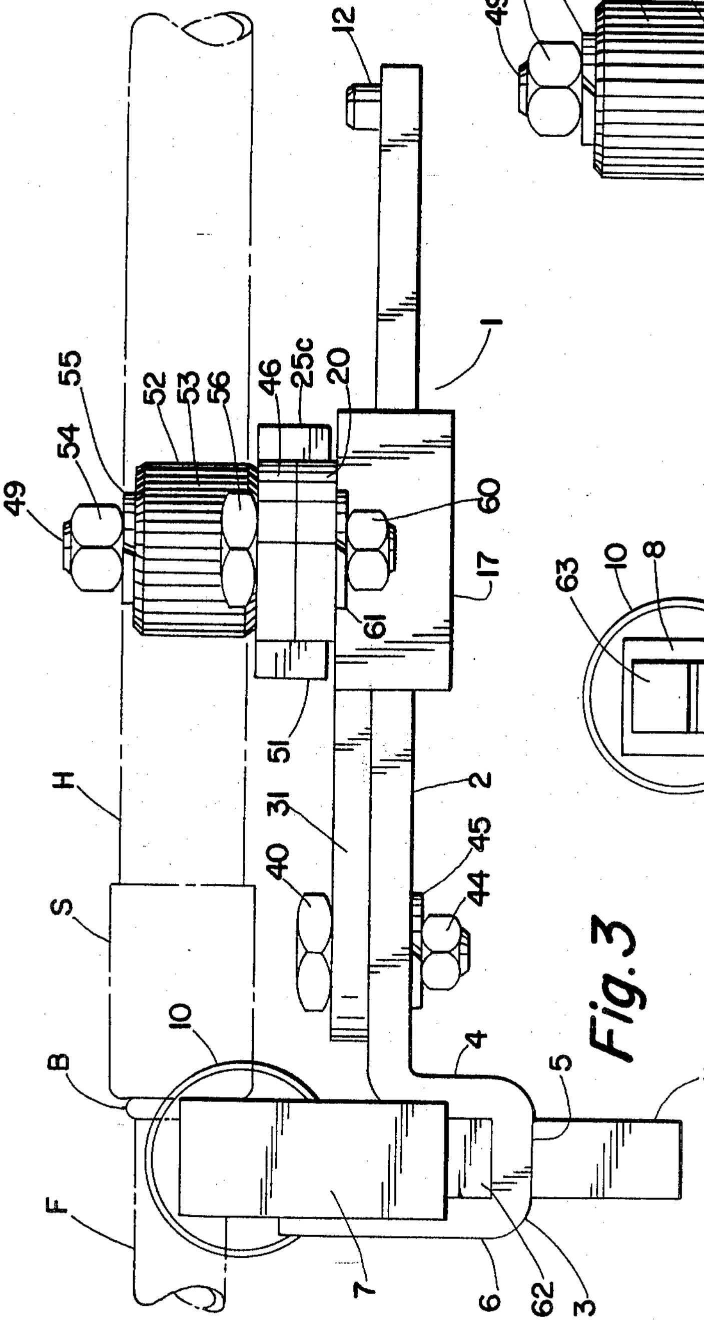
FIG. 3 is a side elevational view of the device or tool, as viewed in the direction indicated by the arrow in FIG. 2.
Figure 6:
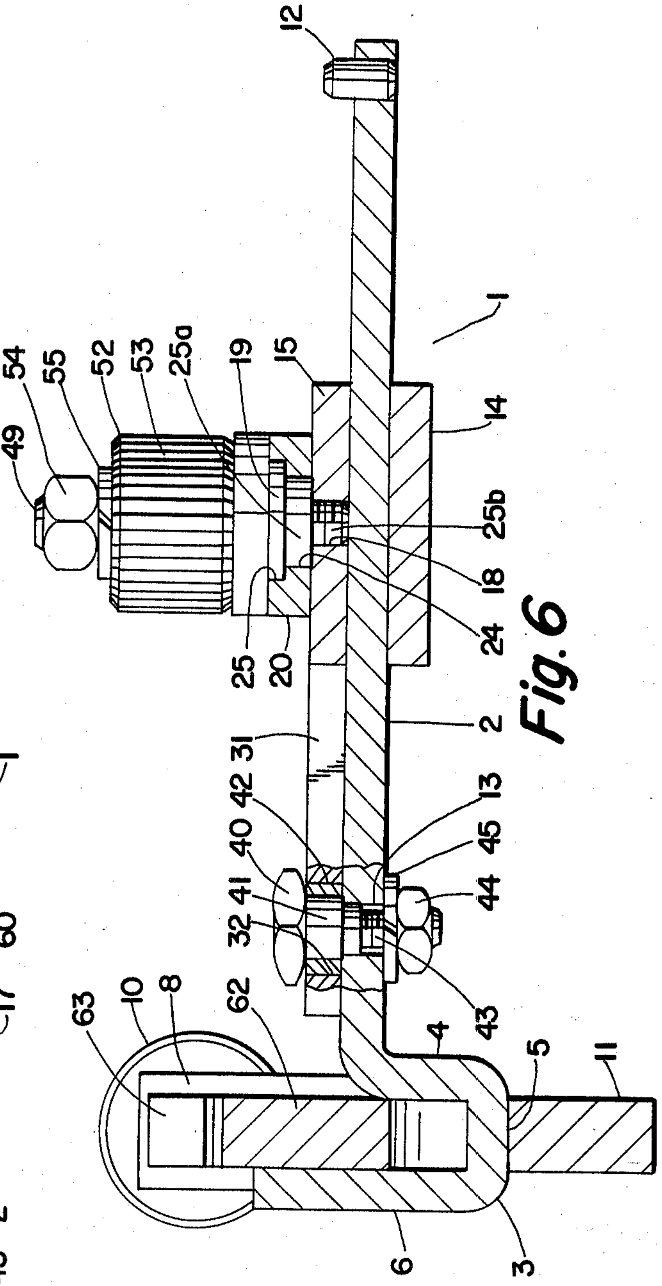
FIG. 6 is a cross-sectional view taken on the line 6—6 of FIG. 2.
Figure 4:
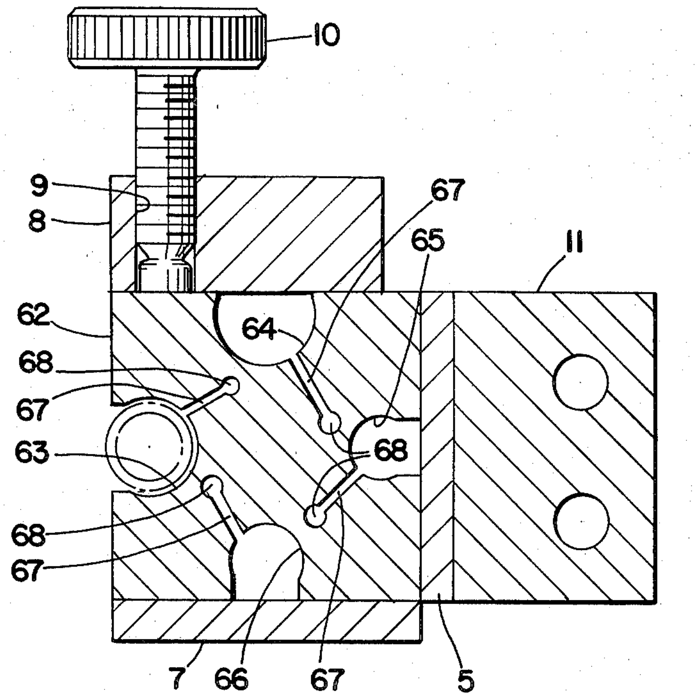
FIG. 4 is a cross-sectional view taken on the line 4—4 of FIG. 3.
Figure 5:
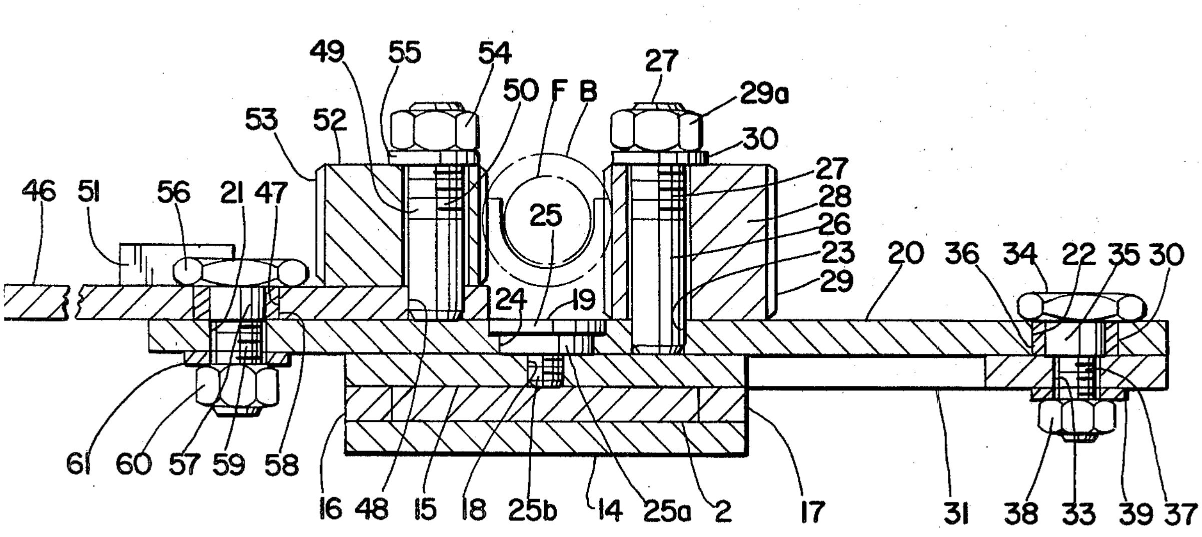
FIG. 5 is a cross-sectional view taken on the line 5—5 of FIG. 2.

The weld assembly 1 further includes an upright bar 11, which depends from and is welded to the bottom 5 of the socket 3, and which is adapted to be clamped in a vise (not shown), for the purpose of supporting the aforesaid weld assembly or frame in an upright or working position, as best shown in FIGS. 3 and 6.

The base 2 of the weld assembly is provided at its outer or rear end with a dowel pin 12 which serves a purpose to be presently described, and is also provided adjacent its inner or forward end with an opening 13 (FIG. 6) for a purpose to be presently described.

Mounted on the base 2 for longitudinal sliding movement along this part is a slide or slide assembly consisting of a pair of vertically-spaced plates 14 and 15 and spacer blocks 16 and 17, which interconnect the marginal side portions of the plates. The plate 15 has a threaded bore 18 at the center thereof.

Secured to the slide assembly, as by means of a bolt 19, is a link assembly. The link assembly comprises a link 20 having an opening 21 adjacent one end thereof, an opening 22 adjacent the other end thereof, an opening 23 at the center of the link, an opening 24 adjacent the opening 23, the opening 24 being counterbored, as at 25, and a stud 26 having its lower end disposed in the opening 23 and welded in said opening.

The bolt 19 has a circular shank portion 25*a* which extends into the opening 24 of the link 20 and about which the link is pivotally movable and has a threaded end 25*b* which is threadedly secured in the threaded bore 18 of the plate 15.

The link assembly further includes an abutment member in the form of a tab 25*c*, which is welded to the side of the link 20 adjacent one end of the link and extends above the upper level of the link. This abutment member serves a purpose to be presently described.

The stud 26 has an upper threaded portion 27.

Mounted on the stud 26 eccentrically of the stud is a roll 28 which is provided on its peripheral surface with circumferentially-spaced teeth 29. The roll 28 is secured to the stud 26 by means of a nut 29*a*, between which and the roll, a lockwasher 30 is interposed.

A second link 31 is provided, having an opening 32 adjacent one end of the link and an opening 33 of smaller diameter than the opening 32, adjacent the other end of the link.

The link 31 is pivotally secured to the link 20 by means of a bolt 34, having a circular shank portion 35 which extends through the opening 22 in the link 20, a bushing 36 being disposed in the opening 22 so that the link is pivotally movable about the bushing. The bolt 34 has a threaded portion 37 which extends through the opening 33 of the link 31, the bolt being secured to the link 31 by means of a nut 38, between which and the link a lock washer 39 is interposed.

The link 31 is pivotally secured to the base 2 of the frame 1 by means of a bolt 40 having a circular shank portion 41 which extends through the opening 32 in the link 31, a bushing 42 being disposed in the opening 32, so that the link 31 is pivotally movable about the bushing. The bolt 40 has a threaded portion 43 which extends through the opening 13 in the base 2 of the frame 1, the bolt being secured to the base 2 by means of a nut 44 between which and the base 2 a lock washer 45 is interposed.

The tool further includes a handle assembly which comprises a handle 46 having an opening 47 adjacent its inner end, an opening 48 spaced inwardly from the opening 47, a stud 49 having a lower unthreaded portion welded in the opening 48, and an upper threaded portion 50. The handle assembly further includes a tab or abutment member 51, which is welded to the side of the handle 46 and extends below the lower surface of the handle and serves a purpose to be presently described.

Mounted on the stud 49 eccentrically of the stud is a roll 52 similar to but shorter than the roll 28, and which is provided on its peripheral surface with circumferentially-spaced teeth 53. The roll 52 is secured to the stud 49 by means of a nut 54 between which and the roll a lock washer 55 is interposed.

The handle 46 is pivotally secured to the link 20 by means of a bolt 56, having a circular shank portion 57 which extends through the opening 47 of the handle, a bushing 58 being disposed in the opening 47, so that the handle is pivotally movable about the bushing. The bolt 56 has a threaded portion 59 which extends through the opening 21 of the link 20, the bolt being secured to the link by means of a nut 60, between which and the link, a lock washer 61 is interposed.

The tool further includes a block, generally designated by reference numeral 62, of square configuration, preferably made of sintered steel and having recesses or openings 63, 64, 65 and 66 of different diameters, in its four sides to accommodate fitting of different diameters.

Each recess or opening has a slot 67 extending radially from the base portion of the slot, and terminating in a small circular opening 68. The function of these slots will be presently explained.

The block 62 is adapted to be mounted in the socket or recess 3 of the base or frame of the tool in the position shown in FIGS. 1, 2, 3, 4 and 6.

The use of the device or tool for assembling a base and fitting will now be briefly described.

With the block 62 in the position shown, the fitting F is placed in the recess or opening 63 in the position shown in FIGS. 1, 2, 3, 4 and 6, with the bead B of the fitting in abutment with the inner face of the block 62, and the annular ridges, ribs or barbs R as shown in FIG. 1.

The slide or slide assembly 14, 15, 16, 17 is then moved rearwardly by means of the handle 46 until the rear edge of the slide or slide assembly comes into engagement or abutment with the dowel pin 12.

For the purpose of insuring that the block 62 is firmly and rigidly mounted in the socket or recess 3, and to prevent movement or dislocation of the block from the socket or recess as well as to prevent the fitting F from moving relatively to the block, the thumb screw 10 is rotated so as to apply pressure against an edge of the block adjacent the recess or opening in which the fitting F is mounted.

This causes the portion of the block which surrounds the fitting to firmly grip or clamp the fitting, and prevents it from moving in the recess or from being axially rotated during the use or operation of the device.

With the handle 46 of the device in the position shown in broken lines in FIG. 1, the hose H having the shell S loosely mounted on its forward end is then mounted in the device in axial alignment with the fitting F, and the handle is then swung about the bolt 56 in a clockwise direction, as viewed in FIG. 1, to thereby bring the roll 52 into engagement with the hose, which occurs when the handle is substantially in the position shown in solid lines in FIG. 1.

Figure 2:
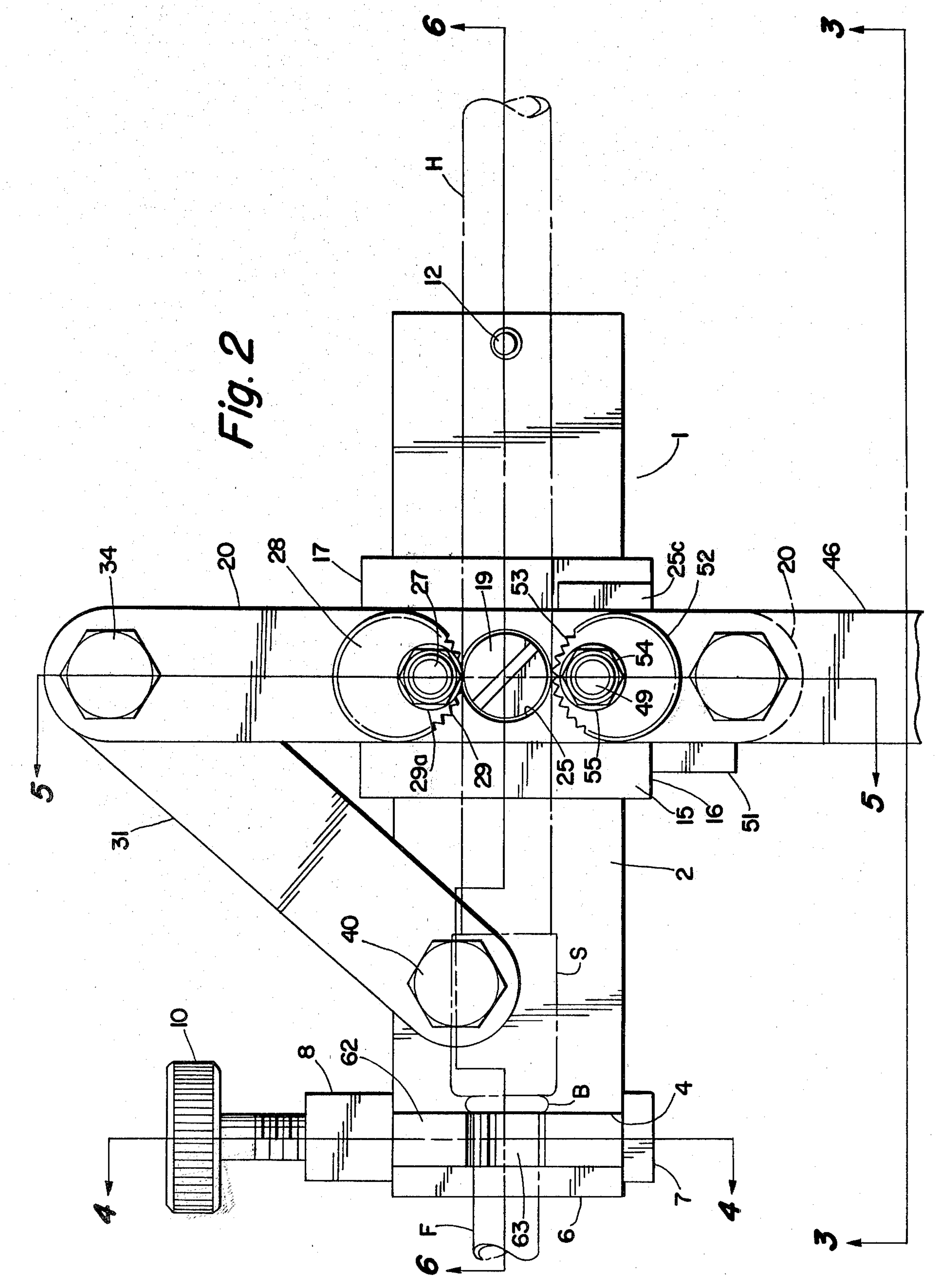
FIG. 2 is a view similar to FIG. 1, but with the parts thereof shown in the position they occupy at the conclusion of the assembly operation.

The handle 46 is then swung from the position shown in solid lines in FIG. 1 to that shown in FIG. 2. This pivotal movement of the handle is terminated by the abutment of the handle with the tab 25*c*, thereby preventing the handle from further pivotal movement about the bolt 56.

This causes the teeth of the rolls 28 and 52 to bite into the hose H at diametrically-opposite sides of the hose, and at the same time, causes the slide assembly to move from the position shown in FIG. 1 to that shown in FIG. 2. This movement causes the portion of the fitting F which is to the right of the bead B to pass through the opening in the left end of the shell S and into the hose.

Clockwise movement of the handle 46 about the bolt 56 to the position shown in FIG. 2 is limited by engagement of the abutment member 51 with the side of the link 20, which also serves to bring the handle into axial alignment with the link 20.

After the fitting and hose have been assembled, the parts of the device are returned to their initial position shown in FIG. 1, and the assembled fitting and hose lifted out of the device.

Due to the eccentric mounting of the rolls 28 and 52, the nuts 29*a* and 54 may be loosened and the rolls rotated about the studs 26 and 49 to adjusted positions to thereby vary the spacing between the rolls to accommodate hoses of different diameters.

In some cases, the fittings F are not provided with the bead F, but the operation of the device is not changed by reason of the fact that the fittings do not have such beads.

It is thus seen that I have provided a device or tool which is eminently adapted for assembling the hose and fitting of hose assemblies used in automotive air conditioning systems, and which greatly facilitates the assembly operation as well as the speed of assembly.

It is also seen that I have provided a device or tool, the use of which insures that the fitting and hose are properly aligned with each other during their assembly.

It is also seen that I have provided a device or tool of the character described which utilizes a holder or block for the fittings, which is of unique design and extremely efficient in holding or clamping the fitting during the assembly operation.

It is further seen that I have provided a tool of the character described, which consists of a minimum number of parts which can be manufactured at low cost and quickly and easily assembled; which can be mounted for use in a standard vise, and which, when not in use, can be stored in a small space or area, and which can be used for assembling hoses and fittings of different sizes or diameters.

While there has been described above the principle of the invention, it is to be clearly understood that this description is made only by way of example, and not as a limitation to the scope of the invention.

Having thus described my invention, I claim:

1. In a device of the character described for assembling a fitting and a hose, means for supporting a fitting and means for moving a hose in axial alignment with said fitting, whereby to cause a portion of said fitting to enter an end portion of said hose and be frictionally secured to said hose, said supporting means comprising an elongated frame having a socket at one end thereof and a block mounted in said socket, said block having a recess for accommodating said fitting, said hose moving means comprising a slide mounted for reciprocal movement along said frame, a link pivotally secured to said slide, a second link pivotally secured to said first link and to said frame, a handle pivotally secured to said first link, a roll mounted on said first link, and a second roll mounted on said handle, said rolls adapted to be moved into engagement with diametrically-opposite sides of said hose.

2. A device as defined in claim 1, wherein said block has recesses of different diameters for accommodating fittings of different diameters.

3. A device as defined in claim 1, wherein a link is provided on which one of said rolls is mounted and a handle is provided on which the other of said rolls is mounted, said handle being pivotally movable relatively to said link, said second roll being movable toward said first roll.

4. A device, as defined in claim 1, wherein said rolls are of cylindrical configuration and have circumferentially-spaced teeth on their peripheral surfaces.

5. A device, as defined in claim 1, wherein said frame is provided with means for stopping rearward movement of said slide.

6. A device, as defined in claim 1, wherein said handle is movable into alignment with said first link, and means is provided on said handle for engaging said first link when said handle has been moved into said alignment, whereby to prevent said handle from continued movement beyond said position of alignment.

7. In a device of the character described for assembling a fitting and a hose, means for supporting a fitting and means for moving a hose in axial alignment with said fitting, whereby to cause a portion of said fitting to enter an end portion of said hose and be frictionally secured to said hose, said supporting means comprising a rectangular block having recesses of different diameters in its sides for accommodating fittings of different diameters and slots extending from said recesses toward the center of said block, whereby to permit portions of the block forming said recesses to be moved toward each other to clamp said fitting.

8. A device, as defined in claim 7, including a thumb screw for applying pressure to at least one portion of the block forming the recesses.

* * * * *